(12) United States Patent
Greer et al.

(10) Patent No.: US 9,822,500 B2
(45) Date of Patent: Nov. 21, 2017

(54) PAVEMENT MARKING PATTERN AND METHOD

(71) Applicant: Flint Trading, Inc., Thomasville, NC (US)

(72) Inventors: Robert W. Greer, Lexington, NC (US); Robert Mantek, Greensboro, NC (US)

(73) Assignee: Flint Trading, Inc., Thomasville, NC (US)

( * ) Notice: Subject to any disclaimer, the term of this patent is extended or adjusted under 35 U.S.C. 154(b) by 124 days.

(21) Appl. No.: 14/954,309

(22) Filed: Nov. 30, 2015

(65) Prior Publication Data

US 2016/0153155 A1 Jun. 2, 2016

Related U.S. Application Data

(63) Continuation of application No. 12/592,462, filed on Nov. 25, 2009, now Pat. No. 9,234,322, which is a continuation of application No. 10/816,635, filed on Apr. 2, 2004, now Pat. No. 7,645,503.

(51) Int. Cl.
| | | |
|---|---|---|
| *B32B 3/10* | (2006.01) | |
| *E01F 9/512* | (2016.01) | |
| *E01F 9/518* | (2016.01) | |
| *E01F 9/576* | (2016.01) | |

(52) U.S. Cl.
CPC .............. *E01F 9/512* (2016.02); *E01F 9/518* (2016.02); *E01F 9/576* (2016.02); *B32B 3/10* (2013.01); *Y10T 428/16* (2015.01); *Y10T 428/24802* (2015.01); *Y10T 428/24826* (2015.01)

(58) Field of Classification Search
None
See application file for complete search history.

(56) References Cited

U.S. PATENT DOCUMENTS 5,215,402 A * 6/1993 Stowell ..................... B44B 5/00
404/93
5,653,552 A * 8/1997 Wiley ................... E01C 23/065
404/77

(Continued)

*Primary Examiner* — Christopher Polley
(74) *Attorney, Agent, or Firm* — Guerry L. Grune; ePatentManager

(57) ABSTRACT

The invention pertains to pavement marking patterns and the application thereof to roads, streets, walkways and the like. Various pattern marking designs replicate bricks, cobblestones, horizontal signage, logos and other components. The marking patterns are composed of two or more independent sections, the first section is a grid representing for example, the mortar joints in a brick wall. The second sections or inserts, for example represent bricks which are contained within the grid. As the first and second sections are generally formed from different colored, preferably thermoplastic materials, a hot melt adhesive spray is utilized on the bottom surface of the marking pattern bridging the intersections between the first and second sections, maintaining the integrity of the marking pattern for convenience during handling and application to a substrate. Preferably the hot melt spray adhesive has approximately the same softening point range as the pattern sections for heat treatment during application.

3 Claims, 5 Drawing Sheets

(56) References Cited

U.S. PATENT DOCUMENTS

| | | | | |
|---|---|---|---|---|
| 5,861,206 A * | 1/1999 | Jensen | ................ | G01K 1/02 |
| | | | | 116/207 |
| 5,895,171 A * | 4/1999 | Wiley | ................ | E01C 23/14 |
| | | | | 404/77 |
| 6,024,511 A * | 2/2000 | Ross | ................ | E01C 19/43 |
| | | | | 404/124 |
| 6,217,254 B1 * | 4/2001 | Wallgren | ................ | E01F 9/518 |
| | | | | 404/14 |
| 6,365,262 B1 * | 4/2002 | Hedblom | ................ | E01F 9/524 |
| | | | | 359/536 |
| 6,371,689 B1 * | 4/2002 | Wiley | ................ | E01C 23/065 |
| | | | | 404/77 |
| 6,382,871 B1 * | 5/2002 | Ross | ................ | E01C 19/43 |
| | | | | 404/75 |
| 6,588,975 B2 * | 7/2003 | Ross | ................ | E01C 9/001 |
| | | | | 249/188 |
| 6,861,141 B2 * | 3/2005 | Buccellato | ................ | C09J 4/00 |
| | | | | 404/14 |
| 2001/0055678 A1 * | 12/2001 | Murata | ................ | C09J 7/0246 |
| | | | | 428/346 |
| 2003/0147695 A1 * | 8/2003 | Hong | ................ | E01C 23/16 |
| | | | | 404/75 |

* cited by examiner

PAVEMENT MARKING PATTERN AND METHOD

PRIORITY

This application is a continuation of and claims priority under 35 U.S.C. §120 of original U.S. patent application Ser. No. 12/592,462 entitled "Pavement Marking Pattern and Method", filed on Nov. 25, 2009, which is a continuation of U.S. patent application Ser. No. 10/816,635 entitled "Pavement Marking Pattern and Method", filed on Apr. 2, 2004, granted Jan. 12, 2010 as U.S. Pat. No. 7,645,503. This referenced application is also hereby expressly incorporated by reference in its entirety.

FIELD OF THE INVENTION

The invention herein pertains to markers for pavement and particularly pertains to pavement marking patterns utilizing two or more independent sections which are sprayed with an adhesive to maintain the integrity of the pattern prior to its application to a substrate.

BACKGROUND OF THE INVENTION

In recent years increasing numbers of municipalities, office complexes, shopping centers and other commercial developments have utilized thermoplastic pavement markings with various patterns and designs to guide, decorate and protect high traffic areas such as highways, pedestrian crosswalks, parking lots and business entrances. A typical, conventional pavement marking pattern as set forth in PCT application US/03/03156 (WO03/064771 A1) consists of a preformed planar thermoplastic sheet or strip having a thickness of approximately 0.01" (2.5 mm). The width of these patterns vary with the purpose of the marking Such patterns may include a first section or grid, for example to represent the mortar joints in a "brick" design and a plurality of second sections or "bricks" which are coplanar therewith, usually in a color different from the mortar color. The second section or bricks which are separately manufactured are inserted into the first section or grid before application of the pattern to the pavement. Various such two section marking patterns are commonly available such as: herringbone, standard brick, cobblestone, paving slabs and many other designs. Marking patterns with more than two sections are also commonly available such as horizontal highway and street signage, logos and many others.

As hereinbefore mentioned, these marking patterns consist of two or more independent sections which must be carefully assembled and handled before applying to pavements such as asphalt, concrete or other suitable substrates. These marking patterns are placed at desired locations such as road crosswalks, intersections, parking lots or other sites. In some cases heat is then applied to soften the pavement marking pattern causing it to firmly adhere to the substrate. Various adhesives can also be used to adhere the marking pattern to the substrate.

While the purchase of such pavement marking patterns is relatively inexpensive, much time and labor is devoted to the assembly and application of the pattern to the substrate. Most patterns consist of two or more sections which are independently formed for manual assembly at the job site and time and effort is needed to assemble and maintain the integrity of a pattern before the heat treatment. Usually the pattern placed on the substrate must be moved manually for adjustment purposes. During such movement, the independent sections in the pattern inadvertently become unaligned, requiring reinsertion or realignment. If the realignment is not precisely accomplished, the marking pattern will have lost its integrity and the entire pattern must be removed manually from the substrate, the substrate cleaned and a second attempt at the application made with the reinserted or new marking pattern. This re-application results in extra time, labor and materials. In the past, to maintain the integrity of the marking pattern before the heat treatment and during the handling and placement, "spot adhesives" have been used which remain somewhat "tacky" after being applied to the bottom of the patterns at the grid intersections to maintain pattern integrity. However, these small adhesive circles or "spots" are generally a different type of polymer than the marking pattern and can prevent proper attachment and easy movement of the marking pattern on the substrate at the spot adhesive locations before and during the heat application of the marking. Also, certain spot adhesives are not compatible with the plastic materials from which the patterns are formed and can cause the pavement marking sections to separate from the substrate after the heat application, as only a weak bond is formed with the substrate.

Thus with the problems and difficulties associated with maintaining the integrity of the pavement marking patterns during handling and application at the job site, the present invention was conceived and one of its objectives is to provide an improved pavement marking pattern in which the pattern sections are properly connected during handling and installation on a selected substrate. It is another objective of the present invention to provide a relatively inexpensive pavement marking pattern having two or more sections in which the sections are joined by use of an applied adhesive.

It is yet another objective of the present invention to provide a method for forming a pavement marking pattern which allows cost efficient factory assembly of the pattern and which prevents dislodging and separation of the pattern sections during handling, transportation and application.

It is still another objective of the present invention to provide an adhesive which can be conveniently sprayed onto the back of pavement marking patterns which will sufficiently adhere thereto and prevent separation of the sections during handling, and not deteriorate the bond between the pavement marking pattern and the substrate.

It is still another objective of the present invention to provide a method for easy application of the adhesively sprayed marking pattern to the substrate.

Various other objectives and advantages of the present invention will become apparent to those skilled in the art as a more detailed description is set forth below.

SUMMARY OF THE INVENTION

The aforesaid and other objectives are realized by providing a conventional pavement marking pattern formed of a thermosetting or thermoplastic having two or more sections, manually joined by bridging the bottom surface thereof with an adhesive having substantially the same temperature softening point as the sections of the marking pattern. The adhesive is sprayed primarily along the intersections of the pattern to cover a percentage (approximately 5-90%) of the pattern bottom surface area while bridging the intersections. The more intricate the pattern (with more joints or intersections), the greater the percentage of coverage required. The spray adhesive can be a typical polyamide, EVA based hot melt adhesive or other and preferably consists of a hot melt polyamide resin based adhesive which is sprayed in a circular or spiral string like configuration at a temperature at or above its softening point. The sprayed hot adhesive strikes the marking pattern and adheres, bridging and bonding the pattern sections to maintain pattern integrity during subsequent handling. Uni-Rez 2633 as sold by Arizona Chemical Company of P.O. Box 550850, Jacksonville, Fla. 32225 is the main ingredient in the preferred hot melt adhesive. The preferred hot melt adhesive is formulated with Uni-Rez 2633, ester modified rosins, fillers, extenders, levelers and other conventional components.

In a typical manufacturing process, various sections of a pavement marking pattern (such as a brick and mortar pattern) are factory assembled and while in assembled form, the bottom of the pattern is sprayed with the hot melt adhesive described above using preferably spray gun model: Hysol-175-spray as manufactured by Loctite Corporation of 1001 Trout Brook Crossing, Rocky Hill, Conn. 06067, having various pressures and nozzle settings to select from, depending on the viscosity of the particular adhesive employed. A circular or spiral string-like adhesive configuration is preferred for the spray.

Once the sprayed hot melt adhesive has cooled, the grid and inserts are suitably bridged and joined and the pavement marking pattern is packaged for shipment. Upon receipt at the job site, the packages are opened and after the intended substrate, usually asphalt or concrete is properly cleaned and swept, the marking pattern is then placed on the substrate without concern of disassembly during handling, movement and adjustment. Once suitably placed, a heat application is delivered from a conventional source which softens the marking pattern and the underlying sprayed adhesive, both of which have the approximate same temperature softening point to thereby affix the pavement marking pattern to the substrate. Time and labor are thereby saved as the marking pattern sections have been adhered to form a unified pattern by the hot melt adhesive.

DETAILED DESCRIPTION OF THE INVENTION

Figure 1:
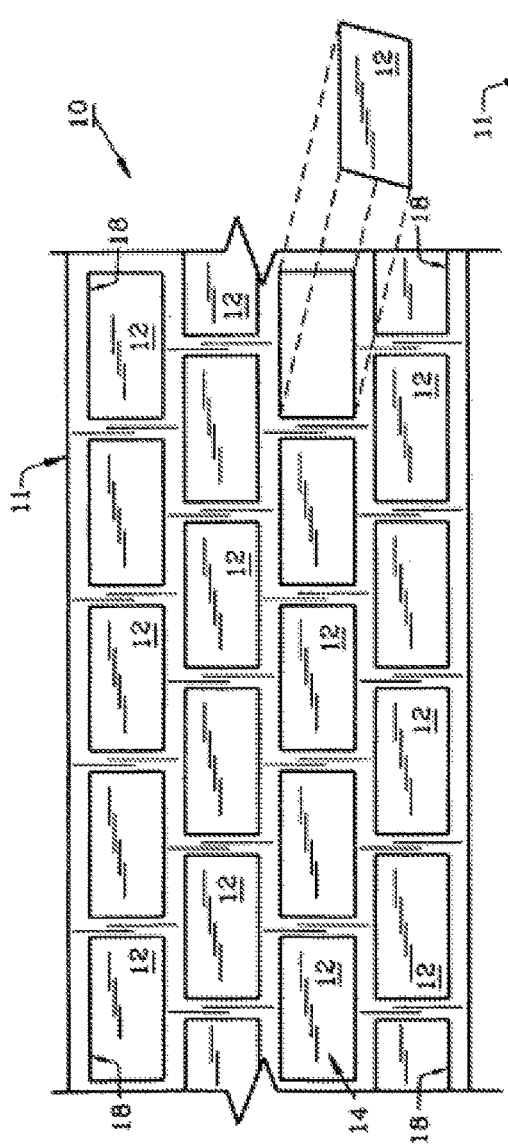
FIG. 1 pictures a top view of a partially assembled pavement marking pattern with one brick exploded therefrom.

For a better understanding of the invention and its operation, turning now to the drawings, FIG. 1 illustrates a typical partial decorative pavement marking pattern 10 for application to concrete, asphalt or other suitable substrates. Marking pattern 10 is a brick and mortar pattern used herein for illustration purposes but as would be understood various other thermosetting and thermoplastic patterns are commercially available such as 90° herringbone, cobblestone, pavement slabs, horizontal signage, logos and other designs. Also, while many colors are available for the pavement marking patterns, typically different sections of each pattern are of different colors, such as a "light" grid or mortar color and a "darker" brick or insert color. The marking patterns typically consist of two or more sections.

Preferred marking pattern 10 shown for demonstration purposes consists of two separate thermoplastic sections, first section 11 represents a grid or mortar joint and second section 12 represents a brick or insert. Sections 11 and 12 are generally formed independent of each other due to the differences in color. Pavement marking pattern 10 is planar and is conventionally formed from a standard thermoplastic.

Figure 2:
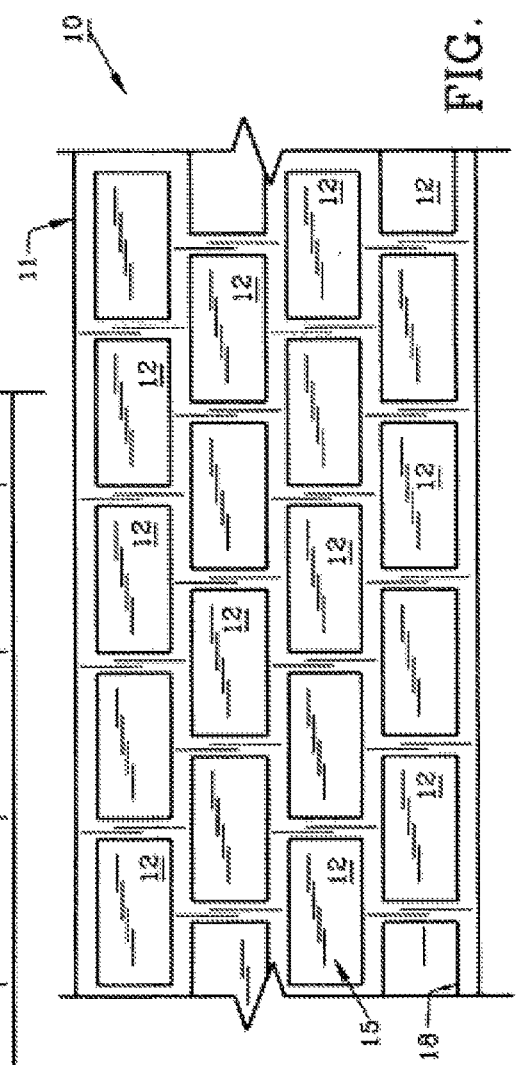
FIG. 2 demonstrates a bottom plan view of the brick pavement marking pattern as shown in FIG. 1 fully assembled.
Figure 3:
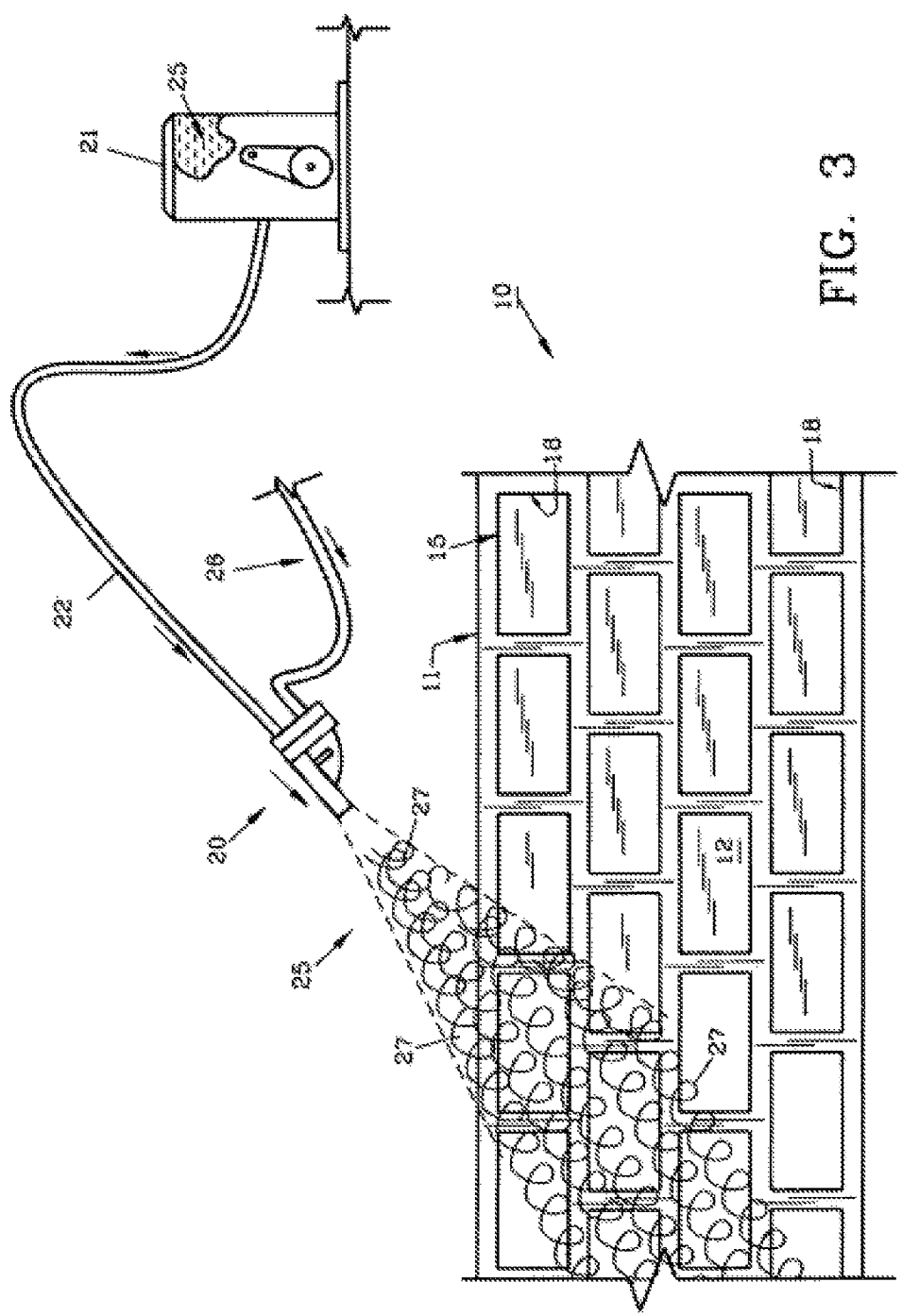
FIG. 3 illustrates in schematic form a spray application of the adhesive to the bottom of the brick pavement marking pattern as seen in FIG. 2.

Once marking pattern 10 has been conventionally formed and assembled as shown in FIG. 2, with bottom 15 of marking pattern 10 facing upwardly, the preferred method steps of the invention are as follows:

Marking pattern 10 is now ready for the adhesive application as seen in FIG. 3 whereby preferably Loctite spray gun 20 receives adhesive 25 which is forced or pumped from tank 21 through conduit 22. Adhesive 25 is then sprayed by using compressed air which passes through hose 26 and directed onto bottom 15 of marking pattern 10. Adhesive 25 is a hot melt polyamide resin based adhesive, preferably composed from Uni-Rez 2633 available from Arizona chemical, delivered at an elevated temperature of approximately 127°-210° C. in a semi-solid condition thereby forming spiral strings 27 on marking pattern bottom 15.

Figure 4:
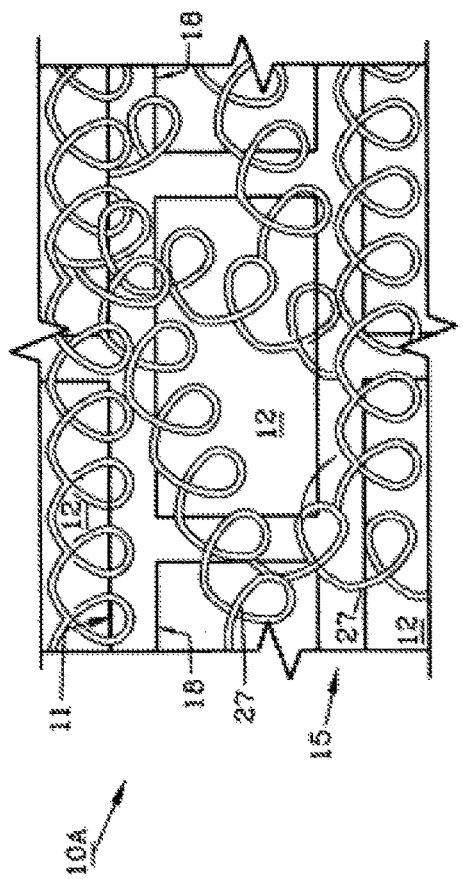
FIG. 4 depicts an enlarged sectional view of the pavement marking pattern as shown in FIG. 3 with the adhesive applied.
Figure 5:
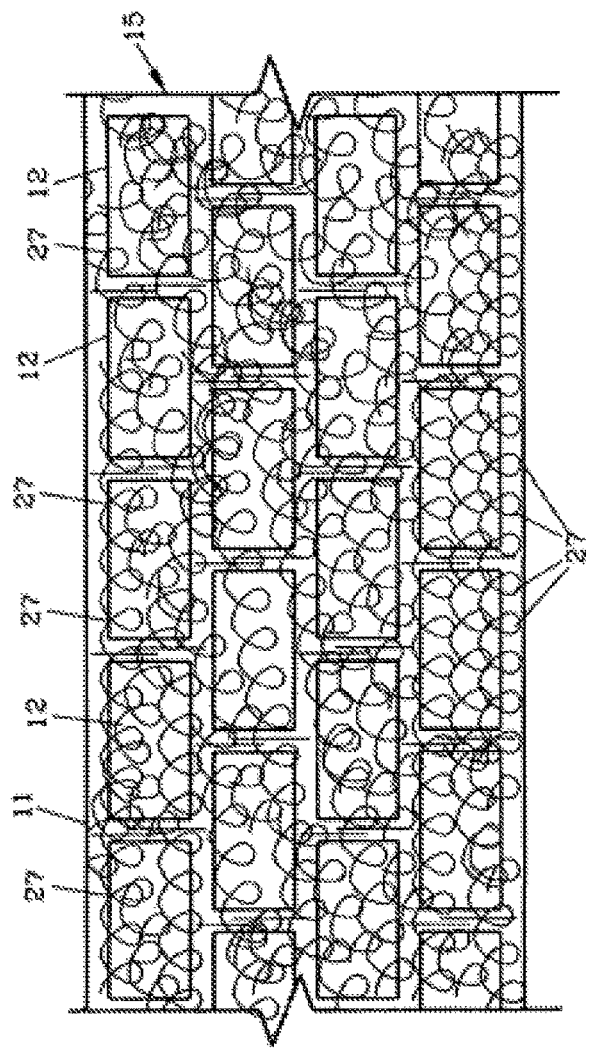
FIG. 5 features the bottom of the pavement marking pattern as seen in FIG. 3 after a typical spray adhesive application is completed.

As shown enlarged in FIG. 4, strings 27 bridge across first grid section II, intersections 18 and second insert sections 12. Upon cooling to room temperature strings 27 harden and bond first section 11 and second section 12 forming unified marking pattern 10A. The area covered by adhesive strings 27 may range from 5-90% of the total marking pattern bottom 15 surface area, depending on the complexity of the particular pattern design. In FIG. 5 the bottom of preferred unified marking pattern 10A is shown with an approximate 30% adhesive area coverage which is preferred for this marking pattern.

Figure 6:
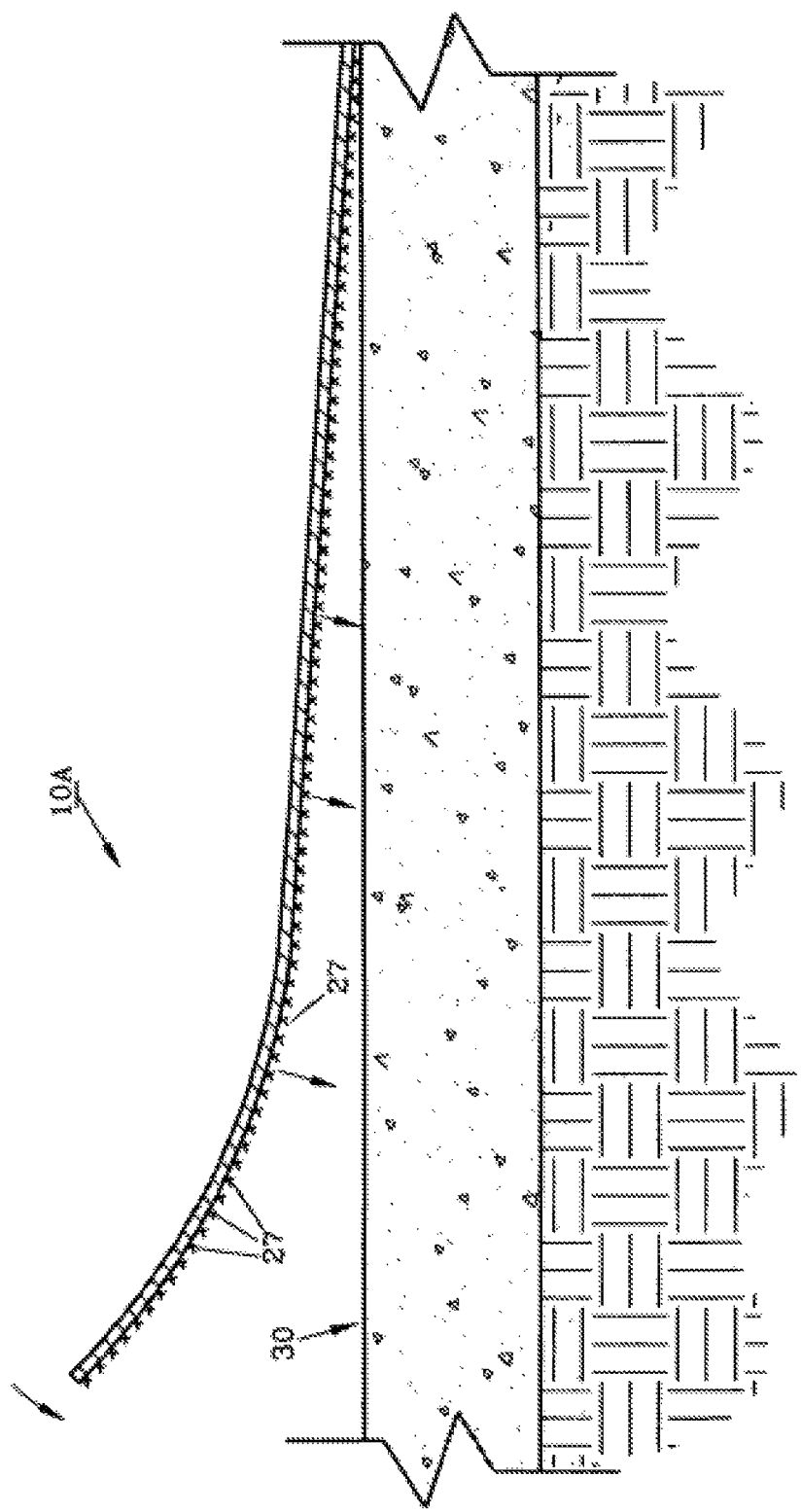
FIG. 6 shows a schematic pavement marking pattern during standard substrate; and cross-sectional view of the initial installation.
Figure 7:
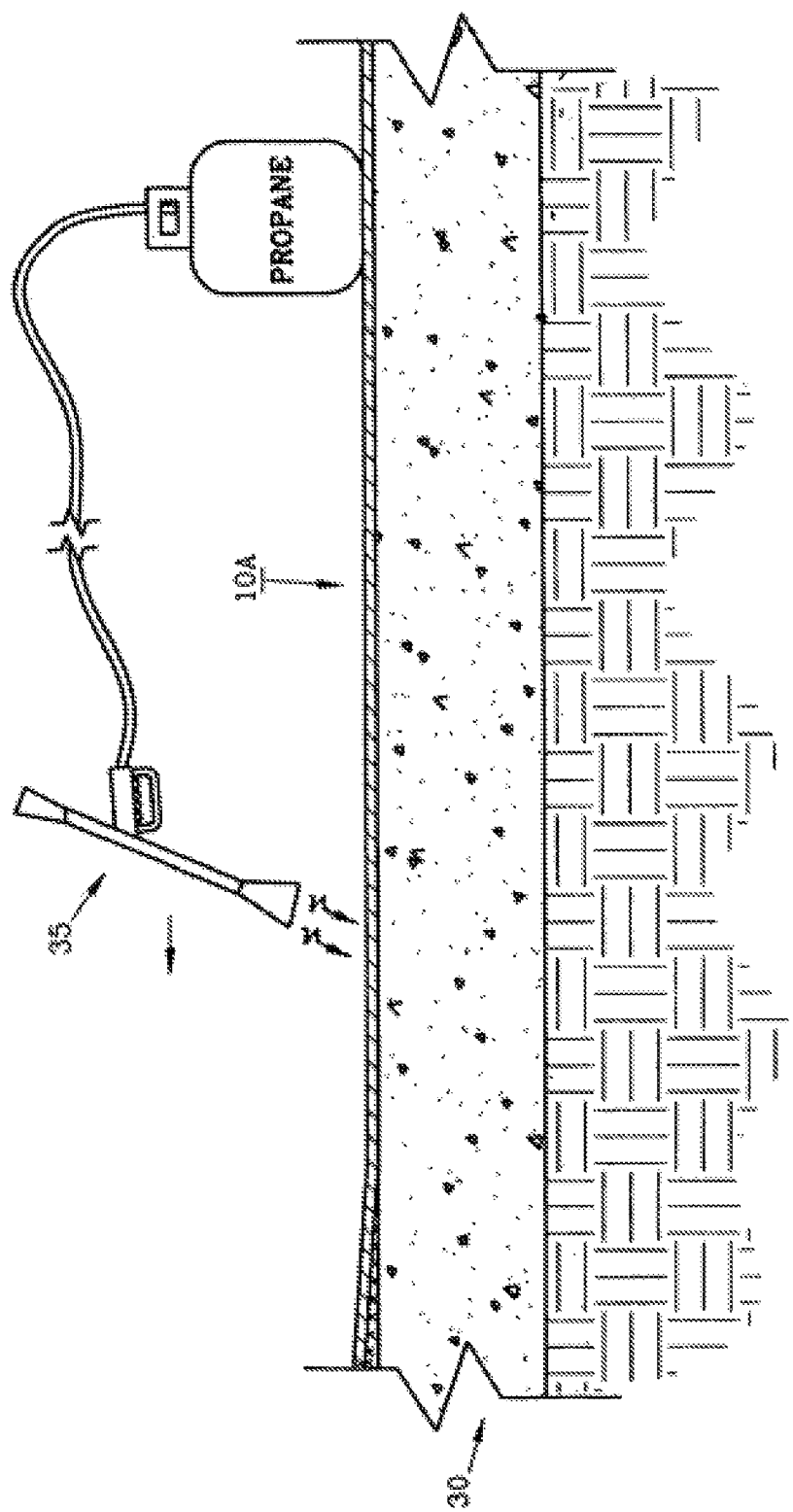
FIG. 7 presents the final installation step of the pavement marking pattern on the substrate with a propane torch heater.

The preferred method of applying marking pattern 10A to a desired substrate such as asphalt 30 shown in FIG. 6 can be described as follows. Preferred marking pattern 10A having adhesive strings 27 bonded thereto is first unrolled or positioned onto cleaned and swept asphalt or concrete 30. Once unrolled or positioned, marking pattern 10A is then moved and shifted for precise placement without fear of pattern disassembly. After suitable placement, marking pattern 10A is then heated with conventional heat torch 35, shown schematically in FIG. 7 whereupon marking pattern 10A and adhesive strings 27 are softened due to their similar or approximate softening points thus resulting in a secure, permanent adherence of marking pattern 10A to asphalt 30. The preferred softening point range for both adhesive strings 27 and marker pattern section 11 and 12 is 90°-120° C. although other thermoplastic materials may be used having different softening points. Additional marking patterns are subsequently similarly applied as necessary for the desired coverage of the particular substrate.

While the preferred adhesive and pavement marking patterns herein are formed of thermoplastic resins, thermosetting resins could also be used but are not preferred such as epoxies or other organic oligomeric or polymeric materials. Such thermosetting adhesive would require a high molecular weight to generate a melt viscosity sufficient to function as a "string spray" adhesive as described above. Such melt viscosity would range from approximately 500 to 100,000 cps with a preferred range of 1500-2000 cps, as are commercially available The illustrations and examples provided herein are for explanatory purposes and are not intended to limit the scope of the appended claims.

We claim:

1. A method of applying a pavement marking pattern having contiguous sections to a substrate comprising the steps of:
   a) forming a pavement marking pattern consisting essentially of: an independent thermoplastic grid section and a plurality of independent thermoplastic insert sections, wherein each of said plurality of insert sections resides within said grid section and said plurality of insert sections are coplanar, and wherein said grid section and said plurality of insert sections both comprise a planar top surface and planar bottom surface that are coplanar to each other,
   b) adhering said plurality of grid sections such that said grid sections are in direct contact with each of said plurality of insert sections thereby forming intersections between said grid section and each of said plurality of insert sections,
   c) adhering said pavement marking pattern to said substrate by spraying a polyamide adhesive backing layer on said coplanar bottom surface in a circular or spiral configuration crossing said intersections, wherein said sprayed polyamide adhesive has a softening point of between 105 and 120 degrees C. and wherein said adhesive is applied at a temperature above said adhesive's softening point such that said adhesive covers 5-90 percent of said coplanar bottom surface.

2. The method of claim 1 wherein adhering the marking pattern to the substrate comprises the step of heating the marking pattern.

3. A method of making a pre-bonded pavement marking pattern comprising:
   a) providing an independent thermoplastic grid section and a plurality of independent thermoplastic insert sections, wherein each of said plurality of insert sections resides within said grid section and said plurality of insert sections are coplanar, and wherein said grid section and said plurality of insert sections both comprise a planar top surface and planar bottom surface that are coplanar to each other, adhering the plurality of grid sections such that said grid sections are in direct contact with each of said plurality of insert sections thereby forming intersections between said grid section and each of said plurality of insert sections, and spraying a polyamide adhesive backing layer on said coplanar bottom surface in a circular or spiral configuration crossing said intersections, wherein said sprayed polyamide adhesive has a softening point of between 105and 120 degrees C. and wherein said adhesive is applied at a temperature above said adhesive's softening point such that said adhesive covers 5-90 percent of said coplanar bottom surface.

* * * * *